April 3, 1951 W. D. COCKRELL 2,547,623
SPOT DETECTOR RECORDER
Filed Dec. 27, 1948
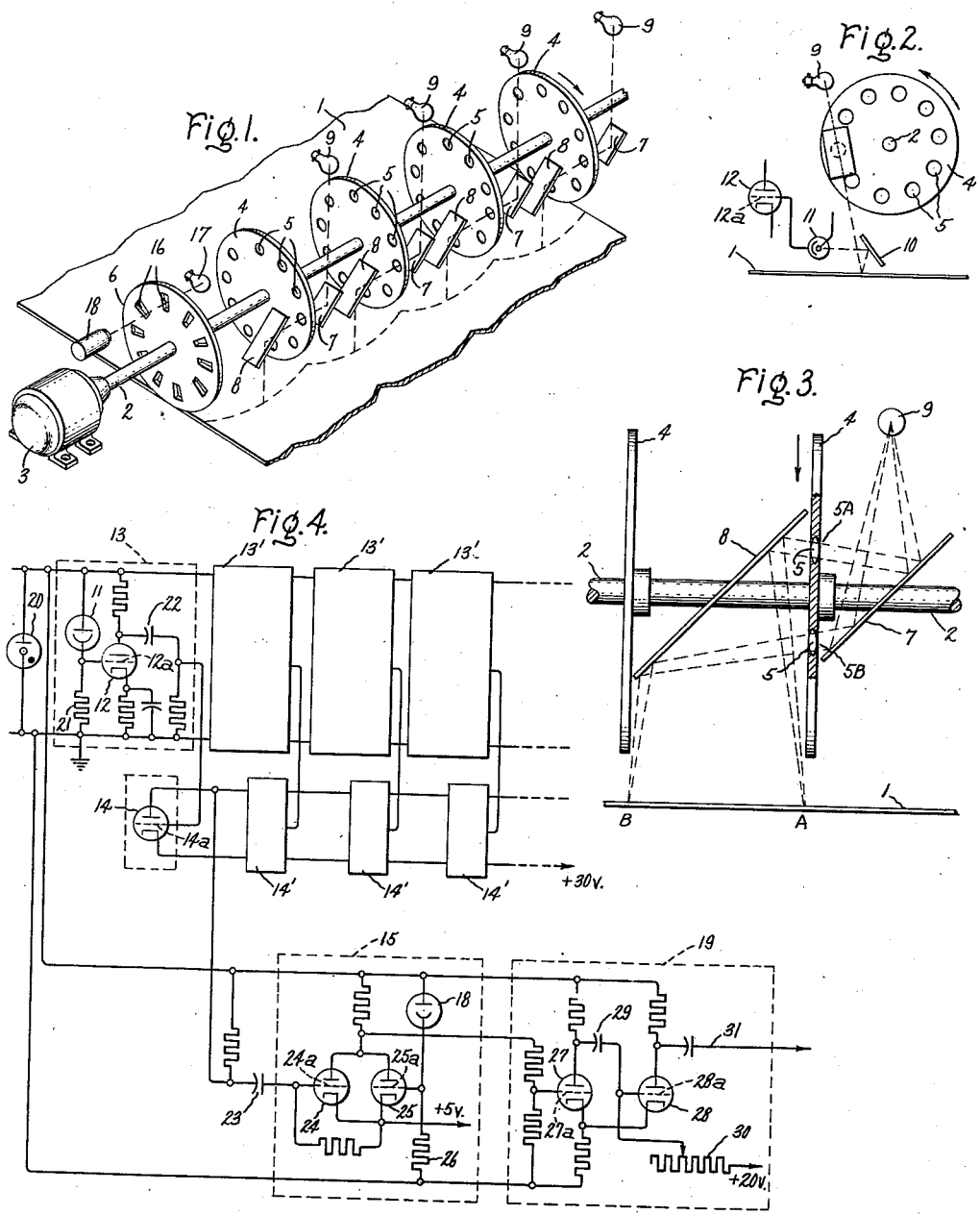
Inventor:
William D. Cockrell,
by Claude S. Mott
His Attorney.

Patented Apr. 3, 1951

2,547,623

UNITED STATES PATENT OFFICE 2,547,623

SPOT DETECTOR RECORDER

William D. Cockrell, Schenectady, N. Y., assignor to General Electric Company, a corporation of New York Application December 27, 1948, Serial No. 67,474

2 Claims. (Cl. 346—33)

My invention relates to electrical control systems and more particularly to electrical control systems which make use of photoelectric devices as the fundamental controlling element. My invention has for an object the provision of a photoelectrically governed control system which accurately detects spots and other imperfections on the surface of continuously moving opaque material.

Heretofore, most photoelectric spot detecting systems for use in locating spots on opaque material have utilized some sort of a reciprocating scanning mechanism. Such a mechanism often utilizes a vibrating mirror or mirror-like metallic surface actuated by a cam mechanism to cause a beam of light reflected from it to scan the surface of the material on which spots or imperfections are to be located. A photoelectric cell responsive to the amount of light reflected from the surface of the material is then used to detect spots or imperfections. Such an arrangement, however, it not readily adaptable for use with rapidly moving material, particularly when very small spots must be detected, because of its relatively slow movement. Nor is such an arrangement readily adaptable for use with very wide moving material, because of the large amount of equipment required to scan a wide surface. It is a further object of my invention to provide a reflected light spot detector which accurately locates small spots and imperfections on wide and rapidly moving material.

In carrying out my invention in one form, I provide a plurality of circular discs equally spaced on a rotating shaft. Each disc has a plurality of openings equally spaced around it on a common radius and each such opening is equipped with a light conducting lens. A mirror is located on each side of each disc at an angle of forty-five degrees with the disc, and a light source is provided for each disc. The mirrors and light source for each disc are arranged so that one mirror reflects the image of the light source through the lenses in the disc as the latter is rotated. This reflection is picked up by the second mirror which reflects the image on to the surface of the material on which spots are to be detected, in the form of a beam of light which continuously scans the surface of the material. The material on which spots or imperfections are to be located moves continuously beneath the rotating discs. The light reflected from each scanning beam of light by the surface of the material is diffused and integrated by a matte white surface placed close to the material, after which the diffused and integrated light energizes a photoelectric cell located in close proximity to the white diffusing surface. The output of the photoelectric cell after being amplified is used to operate a marker circuit to mark the moving material at a point opposite a spot or imperfection in the surface of the material.

For a more complete understanding of my invention, reference should be had to the accompanying drawing, Fig. 1 of which shows in perspective a schematic diagram of one embodiment thereof; Fig. 2 is a side view of one of the scanning discs of my invention, together with the optical system associated therewith; Fig. 3 is a partial view, partly in section, showing additional details of the optical system; and Fig. 4 is an electrical circuit diagram of this embodiment of the invention.

Referring to the drawing, a moving material on which spots and surface imperfections are to be detected is indicated in Figs. 1, 2 and 3 by the numeral 1. Located above material 1 is a rotating shaft 2 with its axis located transversely to the direction of motion of material 1. Shaft 2 is driven by suitable means such as electric motor 3.

Equally spaced along shaft 2 are a plurality of scanning discs 4, each of which is provided with an equal number of apertures. The apertures are spaced equally around each disc on equal radii and each is equipped with a light conducting and focusing lens 5. The lenses in all the scanning discs 4 are in alignment radially and circumferentially. At one end of the shaft 2 is a master disc 6, the operation of which will be described later. On either side of each scanning disc 4, at approximately the same height as shaft 2, are located mirrors 7 and 8. The two mirrors are parallel and are located at an angle of 45 degrees with respect to disc 4. The upper surface of mirror 7 is the reflecting surface, while the lower surface of mirror 8 is the reflecting surface of this mirror.

Directly above mirror 7 is located a light source consisting of an incandescent lamp 9. The image of the filament of lamp 9 is reflected by mirror 7 through lenses 5 to mirror 8 and by the latter on the surface of material 1 on which spots are to be located. As disc 4 rotates, the movement of lens 5 causes the image of the filament of lamp 9 to sweep across the surface of material 1. This is illustrated in detail in Fig. 3 on the accompanying drawing. Assuming that disc 4 in this figure is rotating in the direction indicated by the arrow which corresponds to clockwise rotation in Fig. 1 and counterclockwise rotation in Fig. 2, the image of the filament of lamp 9 appears first on material 1 at point A as a lens 5 comes into the range of the two mirrors at location 5A. As lens 5 moves to the lower position 5B, indicated in Fig. 3, the image on material 1 moves continuously to point B, at which time the beam passes off of mirror 8. Simultaneously with this occurrence, another lens comes into the range of the two mirrors and the sweep cycle is repeated. In this manner, there is a continuous scanning of the surface between A and B by this scanning disc and a similar scanning of adjoining areas of the moving surface by the other identical scanning discs.

The remainder of the optical system is illustrated in detail in Fig. 2 on the accompanying drawing. The light beam which is continuously scanning the surface of material 1 is reflected by it and is integrated and diffused by a member 10. This member, which is located immediately above the surface of material 1 at an angle as indicated in Fig. 2, has a length approximately equal to the width of the area scanned by one scanning disc and has a dull or matte white surface on the lower side. It will be understood that while member 10 is shown schematically in Fig. 2 as being flat, it may and preferably does have a hyperboloid reflecting surface. In some cases, however, a flat reflecting surface is satisfactory. It will be understood further that there is a member 10 for each disc 4, although in the actual construction of a spot detector apparatus in accordance with this invention the plurality of members 10 may be formed as a single part extending beneath the rotating discs across the width of the material being scanned. From member 10 the light is reflected to photoelectric device 11. The output of photoelectric device 11 is amplified by electron discharge device 12 which is located immediately adjacent thereto.

Referring to Fig. 4 on the accompanying drawing, the combined photoelectric cell-amplifier circuit for one scanning disc is indicated by the dotted rectangle 13. Each of the additional solid rectangles 13' indicates a circuit duplicate of circuit 13 for an additional scanning disc, the total quantity of photoelectric cell-amplifier circuits being equal to the total number of scanning discs 4. The output of circuit 13 is impressed on the control electrode 14a of an electron discharge device 14, the cathode of which is maintained at a potential sufficiently positive with respect to control electrode 14a that device 14 does not conduct current under quiescent conditions. Solid rectangles 14' indicate additional triodes, duplicates of device 14, connected in parallel with device 14 to form a common collector circuit for all photoelectric cells. The quantity of collector triodes equals the number of photoelectric cell-amplifier circuits and the number of scanning discs 4.

The parallel anode circuit of triode 14 and triodes 14' is connected to a circuit indicated by dotted rectangle 15, which is associated with master disc 6; the operation of circuit 15 is explained in detail below.

Master disc 6 has spaced equally around it on a common radius a quantity of apertures 16 equal to the number of lenses in each of the scanning discs 4. On one side of master disc 6 is located a light source composed of an incandescent lamp 17. On the other side is located a photoelectric cell 18 with the latter being positioned so that it receives a beam of light from light source 17 each time that an aperture 16 passes between them. The output of photoelectric device 18 is utilized in circuit 15 to prevent spurious operation of the spot detector during transition periods between sweeps of the surface scanning light beams.

The output of circuit 15 is used to energize a single-shot multivibrator circuit, that is a multivibrator which is operated by a signal to produce a single pulse of voltage and then returns to its normal inoperative condition, and which is indicated by dotted rectangle 19. The latter, in turn, energizes a marker or other device (not shown) to indicate that a spot or irregularity is present on the surface of material 1.

In the operation of the spot detector, the material 1 is moved continuously by external means (not shown) beneath rotating shaft 2. The material 1 is continuously scanned over its entire width by beams of light from the optical system comprising lamps 9, mirrors 7 and 8 and rotating lenses 5. If there is a spot or other imperfection on the surface of material 1, the amount of light reflected by the surface of material 1 is momentarily reduced as the scanning beam passes that point. This causes a reduction in the intensity of the light reflected upon diffusing and integrating member 10 with a resulting reduction in light intensity upon photoelectric device 11. Such a reduction in light intensity decreases momentarily the current flowing through photoelectric device 11 and initiates the following action of the remainder of the electrical circuit.

The electrical circuit is operated from a constant potential power supply provided by voltage regulator 20 which may be of the gas-filled electron discharge type. Photoelectric device 11 is connected in series with resistor 21 across this source of constant potential with the control electrode 12a of triode amplifier 12 being connected at the junction between device 11 and resistor 21. When the light intensity on device 11 decreases, the current flowing through device 11 and resistor 21 also decreases. This causes the potential of control electrode 12a to decrease, which causes an increase in the anode voltage of device 12. The anode of device 12 is coupled to the control electrode 14a of device 14 through a capacitor 22 but, as mentioned previously, the potential of control electrode 14a normally is sufficiently negative with respect to the cathode of device 14 that it is below cut-off potential and no anode current flows through device 14. When control electrode 14a receives a positive voltage pulse of predetermined magnitude from the anode of device 12 in response to the presence of a spot on material 1, the potential of control electrode 14a is increased above cut-off potential and current flows through device 14. This, in turn, reduces the anode potential of device 14.

The anode potential of device 14 is applied through coupling capacitor 23 to the control electrode 24a of an electron discharge device 24. Device 24 is connected in parallel with a duplicate electron discharge device 25 whose control electrode 25a is responsive to another light-sensitive circuit comprising photoelectric device 18 in series with a resistor 26; control electrode 25a is connected at the junction of devices 18 and 26. Control electrode 24a is normally above cut-off potential so that device 24 conducts anode current during quiescent operation of the spot detector. But when a spot occurs on material 1, the potential of control electrode 24a is reduced below cut-off potential and device 24 ceases to conduct, which increases the anode voltage of device 24. If this occurs at a time when parallel triode 25 is not conducting, multi-vibrator circuit 19 will be energized and caused to operate in the manner described later.

As mentioned above, master disc 6 and its associated light source 17 and photoelectric device 18 are provided to prevent spurious operations of the spot detector during transition periods of the scanning circuits. The apertures 16 in master disc 6 are located so that a beam of light is allowed to pass from light source 17 to photoelectric device 18 at the instant that the scanning beam reaches the end of its sweep, at point B as shown in Fig. 3. This light falling upon device 18 causes it to conduct current which increases the potential of control electrode 25a. This, in turn, decreases the potential of the anode of device 25, together with the anode of parallel connected device 24, and prevents the operation of multivibrator circuit 19, even though a signal is received by device 24 from the scanning mechanism during this period. This means that multivibrator circuit 19 will not operate during the transition period when one lens is leaving and another lens is entering the space between mirrors 7 and 8 if there should be a spurious signal given during this transition period.

In order to assure that the use of the lockout circuit comprising photoelectric device 18 and triode 25 does not result in spots being overlooked on moving material 1, adjacent scanning areas overlap sufficiently that the entire width of material 1 is adequately scanned before the lockout circuit is energized.

Circuit 19 is a conventional one-shot multivibrator circuit comprising two triode electron discharge devices 27 and 28. Under quiescent conditions, device 28 carries a large anode current which causes the cathodes of both device 27 and device 28 to be considerably positive with respect to ground potential, thus preventing the flow of anode current through device 27. However, when a sufficiently positive voltage pulse is applied to control electrode 27a of device 27 as a result of the increase in anode potential of device 24 when a spot is detected, multi-vibrator action is initiated. As a result of this action, the anode current is transferred from device 28 to device 27, while the control electrode 28a of device 28 is driven negative so that the anode current of device 28 is cut off. This condition persists until the charge on a capacitor 29, which connects the anode of device 27 and the control electrode 28a of device 28 is able to leak off through a resistor 30 sufficiently to reduce the negative voltage on control electrode 28a to the point where device 28 can again conduct. The anode current then switches back to device 28 and the original quiescent condition of multivibrator circuit 19 is restored.

The action of the multivibrator circuit in momentarily cutting off the anode current through device 28 causes a momentary increase in the anode voltage of device 28. This voltage pulse is transmitted by a conductor 31 to a marker or other device (not shown) to provide a permanent record of the location of the spot or irregularity which has been located on the surface of material 1.

When conventional auto headlamp bulbs, for example, are used as the light sources 9 for scanning discs 4, an image on moving material 1 measuring approximately .040" x .080" is easily obtainable. With shaft 2 turning at a speed of 3450 R. P. M., for example, and 10 lenses in each scanning disc, 34,500 sweeps of light per minute are obtained from each scanning disc. Under these conditions, spots can be detected on material 1 when it is moving at a speed greater than 200 ft. per minute. It has been found that it is possible to detect spots ⅛" in diameter, or smaller, using discs which are 7 inches in diameter and a 4-inch wide coverage by each scanning beam on material 1.

My invention is useful in detecting spots and surface irregularities and imperfections on textiles, paper, tin plate, and other materials which are processed in the form of a continuous strip. It is also useful in detecting spots and surface irregularities and imperfections on material which can be passed beneath the rotating discs in the form of a succession of continuous sheets. In the latter case, it is necessary to provide a means for preventing spurious operation of the spot detector during intervals between individual sheets. One simple means for accomplishing this is the provision of a highly light reflective surface beneath the material, such as chromium steel, for example, so that the light intensity on the photoelectric devices is increased rather than decreased during the intervals between sheets of material. The spot detector is not sensitive to an increase of reflected light intensity, only to a reduction thereof.

The use of a highly reflective surface beneath material 1 also provides means for preventing spurious operation of the spot detector resulting from a scanning light beam passing beyond the edge of the material being scanned. In this case, as before, no reduction in light intensity occurs when the light beam leaves the material being scanned so no signal is given by the photoelectric cell. Such a means may be necessary, particularly if the edges of material 1 are uneven, and it is applicable to both edges, although it normally is possible to adjust the scanning mechanism laterally to bring the limit of the scanning beams into coincidence with at least one edge of the material being scanned. With my invention, it is possible to detect spots and imperfections on the surface of moving material of any reasonable width such as, for example, a 200" wide strip of tin plate, which some mills are now equipped to produce.

While I have illustrated and described one preferred embodiment of my invention, many modifications will occur to those skilled in the art and, therefore, it should be understood that I intend to cover by the appended claims any such modifications as fall within the true spirit and scope of my invention.

What I claim as new and desire to secure by Letters Patent of the United States is:

1. A spot detector comprising a light source, means for projecting the image of said light source upon the moving surface of a material on which spots are to be detected, said means comprising a rotating disc having a plurality of openings equally spaced around it on equal radii and a pair of parallel mirrors located on opposite sides of said disc in angular relation therewith, each of said openings having a lens positioned therein, said means being constructed and arranged so that the image of said light source is reflected by one mirror and is transmitted by said moving lenses to the other mirror which reflects the image onto the surface of said material, the motion of said lenses causing said image to sweep across surface of said material, said lenses being sufficient in number and dimensions to cause said image continuously to scan said surface, means for integrating the light reflected from said surface, and a photoelectric cell responsive to said integrated light.

2. A spot detector for continuously moving strip material comprising a source of light, means for causing images of said source of light to sweep continuously across transversely the surface of said moving material on which spots are to be detected, said means comprising two parallel mirrors located on opposite sides of a rapidly rotating disc at approximately a forty-five degree angle with said disc, said light source and said mirrors being arranged so that the image of said source is reflected by one mirror, said disc having a plurality of apertures equally spaced around it and equidistant from the center of rotation of the disc, each said aperture having therein a lens for conducting light from said one mirror to the other mirror, the latter mirror reflecting said image on to the surface of said material, a matte white surface for integrating and diffusing the light reflected from said material, a phototelectric cell responsive to said integrated and diffused light, electron discharge device amplifying means for the output of said photoelectric cell, a single-pulse multivibrator circuit responsive to the amplified output of said photoelectric cell to energize a marker circuit each time there is a spot on said moving material to cause a mark to be made on said material at a point opposite the location of said spot, and means for preventing spurious operation of said spot detector during the transition periods between sweeps of said continuous sweeps of light, said last-named means comprising a slotted rotating disc and a second photoelectric cell, the slots in said slotted disc being arranged to admit light to the said second photoelectric cell during the said transition periods between sweeps of light.

WILLIAM D. COCKRELL.

REFERENCES CITED

The following references are of record in the file of this patent:

UNITED STATES PATENTS

| Number | Name | Date |
| --- | --- | --- |
| 2,264,873 | Cockrell | Dec. 2, 1941 |
| 2,474,098 | Dimmick | June 21, 1949 |